Aug. 9, 1938.  A. NAGEL  2,126,341

FILM GATE CONSTRUCTION

Filed Oct. 22, 1937

August Nagel
INVENTOR

BY Newton N. Perrins
George A. Gillette, Jr.
ATTORNEYS

Patented Aug. 9, 1938

2,126,341

UNITED STATES PATENT OFFICE 2,126,341

FILM GATE CONSTRUCTION

August Nagel, Stuttgart, Germany, assignor to Eastman Kodak Company, Rochester, N. Y., a corporation of New Jersey Application October 22, 1937, Serial No. 170,360
In Germany June 18, 1937

8 Claims. (Cl. 88—17)

The present invention relates to a film gate construction and more particularly to a film gate construction for a film magazine.

The use of floating film gates is already known and the use of floating film gates in film magazines is disclosed in Wittel Patent No. 1,942,891, issued January 9, 1934. However, in such instances the floating gate is resiliently engaged by at least two separate resilient members, one bearing upon the apertured plate of the film gate and another spring member bearing upon the presser member for holding the film against the apertured plate.

The primary object of the present invention is the provision in a photographic film gate of a single resilient member acting both upon the apertured plate and also upon the presser member.

Another object of the invention is the provision in a film magazine of a single spring member having marginal portions bearing upon side walls of the apertured plate and having central portions bearing upon the presser member for holding the film against the apertured plate.

Other and further objects of the invention will be apparent to those skilled in the art from the following description.

The above and other objects of the invention are obtained in a photographic film gate comprising an apertured plate movably mounted with respect to its support and a presser member adapted to support a film strip against said apertured plate in combination with a single resilient member mounted on said support and engaging said apertured plate to urge the same toward the support and also engaging the presser member to urge it toward the apertured plate. Although the particular description herein relates to the application of the invention to a film magazine, it is to be understood that the invention is also applicable to film gates for other types of apparatus, such as cameras, projectors, etc.

Reference is hereby made to the accompanying drawing wherein similar reference characters designate similar elements and wherein.

Figure 1:
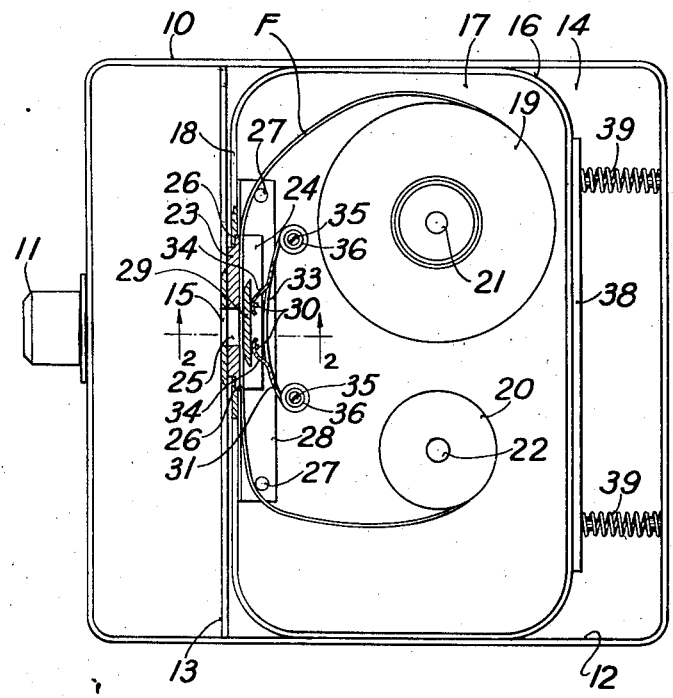
Fig. 1 is a side elevation of a motion picture camera of the magazine type containing a film magazine with its cover removed, a partial section being taken through the film gate members.

As before mentioned, one type of photographic apparatus in which the invention may be employed is a motion picture camera of the magazine type. Such a motion picture camera comprises a camera housing 10 to which an objective 11 is attached. The camera housing 10 provides a magazine chamber 12 which is defined at its forward end by a front plate 13 and at its side by a mechanism plate 14. Front plate 13 is provided with an exposure aperture 15 in line with objective 11.

The film magazine may comprise a casing 16 having a side wall 17, a lateral wall 18 and a cover (not shown). A supply film roll 19 and a take-up roll 20 are mounted in a conventional manner, respectively, by spindles 21 and 22 on the side wall 17 of casing 16.

The film gate includes a channel-shaped plate composed of a central wall 23 and a pair of side walls 24 spaced at a distance corresponding to the width of the film strip. Said central wall 23 is provided with an exposure aperture 25 in registry with exposure aperture 15 in front plate 13 and has at each end shoulders 26. The front lateral wall 18 of the magazine casing 16 is provided with an opening through which central wall 23 may extend and is recessed so as to receive the shoulders 26 on central wall 23. Such arrangement of the apertured plate and lateral wall of the magazine casing provides a guide means for said apertured plate and at the same time creates a relatively light-tight connection therebetween.

The film F extends from the supply film roll 19, between the side walls 24 of the apertured plate, across exposure aperture 25 to the take-up film roll 20. Resilient bends may be created in the film strips between the film rolls and gate by a pair of studs 27 on a bracket 28 within the magazine casing 16 adjacent the forward lateral wall thereof.

A presser member 29 also constitutes a part of the film gate and fits between the side walls 24 of the apertured plate for engagement with the film strip F. A plurality of pins 30 project from the rear of said presser member 29.

Figure 2:
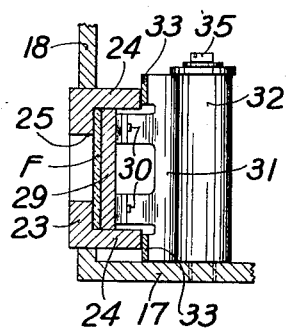
Fig. 2 is a fragmentary horizontal section to enlarged scale taken on the line 2—2 of Fig. 1.
Figure 3:
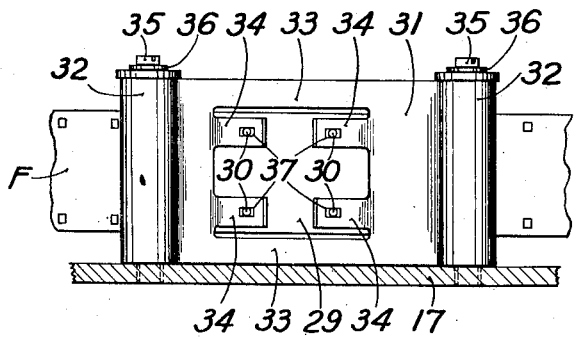
Fig. 3 is a fragmentary rear elevation to enlarged scale of the film gate according to the invention illustrating particularly the formation of the single resilient means.

The single resilient member of the invention may be arranged or composed in a variety of ways. A preferred form of such resilient means constitutes a spring member 31 having curved ends 32, marginal portions 33 and central portions 34. Said spring member 31 is mounted within the magazine casing 16 by means of a pair of bolts 35 which are threaded into the side walls 17 and which bear against washers 36 engaging the curved ends 32 of spring member 31 to hold it in the position shown. As best illustrated in Fig. 2 the marginal portions on spring member 31 bear against the side walls 24 of the apertured plate and central portions 34 bear against the rear surface of presser member 29. Said central portions 34 are each provided with a slot 37 for receiving the pins 30 on the rear of presser member 29 and forming a detachable connection therewith. It is preferred to construct spring member 31 so that said marginal portions 33 are relatively strong and exert a strong spring pressure upon the apertured plate, while central portions 34 are relatively weak and exert a relatively weak pressure upon the presser member 29.

The action of the single spring member according to the invention is to move the apertured plate outwardly with respect to the film magazine. When the film magazine is inserted into magazine chamber 12, the central wall 23 of the apertured plate bears against front plate 13 of the camera and a positioning means composed of a backing plate 38 operated by springs 39 urges the film magazine casing 16 forwardly of the camera and the front surface of the apertured plate against the camera front plate 13. The ultimate function of the floating gate is already understood from the disclosure of the aforementioned U. S. Patent No. 1,942,891 and it is the particular arrangement and formation of the resilient means that constitutes the subject matter of the present invention. Since other arrangements and formations of the single spring member are possible, the present disclosure is merely illustrative and the scope of the invention is defined by the following claims:

Having now particularly described my invention, what I desire to secure by Letters Patent of the United States and what I claim is:

1. In a photographic apparatus, the combination with a support, an apertured plate mounted for movement with respect to said support, and a pressure member adapted to support a film strip against said apertured plate, of a single resilient member mounted on said support, engaging said apertured plate and said presser member for urging said apertured plate toward said support and said presser member toward said apertured plate.

2. In a photographic apparatus, the combination with a support, an apertured plate mounted for movement with respect to said support, and a presser member adapted to support a film strip against said apertured plate, of a single resilient member mounted on said support, having a strong portion engaging said apertured plate to urge it toward said support and having a weak portion engaging said presser member to urge it toward said apertured plate.

3. In a film magazine, the combination with a casing having a plurality of walls, an apertured plate mounted for movement with respect to one of said walls, and a presser member adapted to hold a film strip against said apertured plate, of a single resilient member mounted within said casing, engaging said apertured plate and said presser member, and for urging said apertured plate toward said wall and said presser member toward said apertured plate.

4. In a film magazine, the combination with a casing having a plurality of walls, an apertured plate, a guide means between one of said walls and said apertured plate for movably supporting said plate with respect to said wall, and a presser member adapted to support a film strip against said apertured plate, of a single resilient member mounted within said casing, having a portion engaging said apertured plate to urge it toward said wall of the casing, and having another portion engaging said presser member to urge it toward said apertured plate.

5. In a film magazine, the combination with a casing having a plurality of walls, an apertured plate mounted for movement with respect to one of said walls, and a presser member adapted to hold a film strip against said apertured plate, of a single resilient member mounted within said casing, having a strong portion engaging said apertured plate to urge it toward said wall of the casing, and having a weak portion engaging said presser member to urge it toward said apertured plate.

6. In a film magazine, the combination with a casing having a plurality of walls, an apertured plate mounted for movement with respect to one of said walls of the casing, a presser member adapted to support a film strip against said apertured plate, and a side wall on said apertured plate for guiding the edge of said film strip, of a single spring member mounted within said casing, having a marginal portion engaging the side wall of said apertured plate to urge it outwardly of the casing, and having another portion engaging said presser member to urge it toward said apertured plate.

7. In a film magazine, the combination with a casing having a plurality of walls, a channel-shaped plate movably mounted with respect to one wall of said casing and including a central wall provided with an aperture and a pair of side walls spaced at the width of a film strip, and a presser member fitting between the side walls of said plate and adapted to support a film strip against the central wall thereof, of a single spring member mounted within said casing, having marginal portions engaging the side walls of said plate, and having a central portion engaging said presser member to urge it toward said plate.

8. In a film magazine, the combination with a casing having a plurality of walls, a channel-shaped plate movably mounted with respect to one wall of said casing and including a central wall provided with an aperture and a pair of side walls spaced at the width of a film strip, and a presser member fitting between the side walls of said plate and adapted to support a film strip against the central wall thereof, of a single spring member mounted within said casing, having marginal portions engaging the side walls of said plate, and having a central portion engaging said presser member to urge it toward said plate and a detachable connection between said presser member and the central portion of said spring member.

AUGUST NAGEL.